3,589,950
VALVE SPRING PROCESSING
William M. Justusson, Farmington, Mich., assignor to Ford Motor Company, Dearborn, Mich.
Filed Apr. 21, 1969, Ser. No. 817,982
Int. Cl. C21d *1/18, 9/02*
U.S. Cl. 148—12     2 Claims

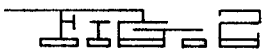
FIG. 2
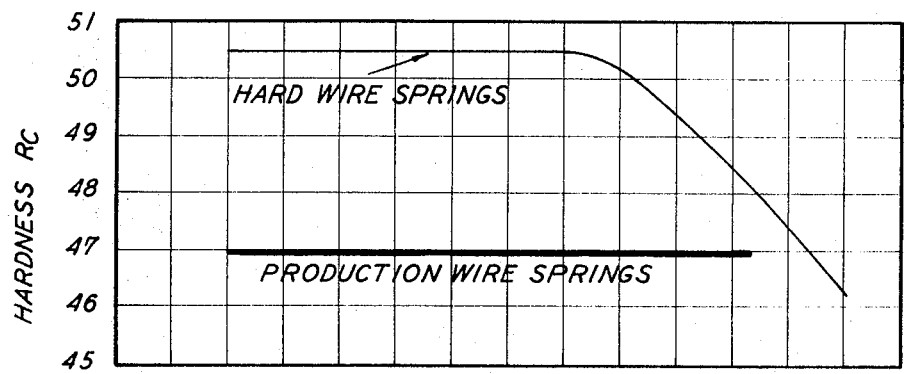
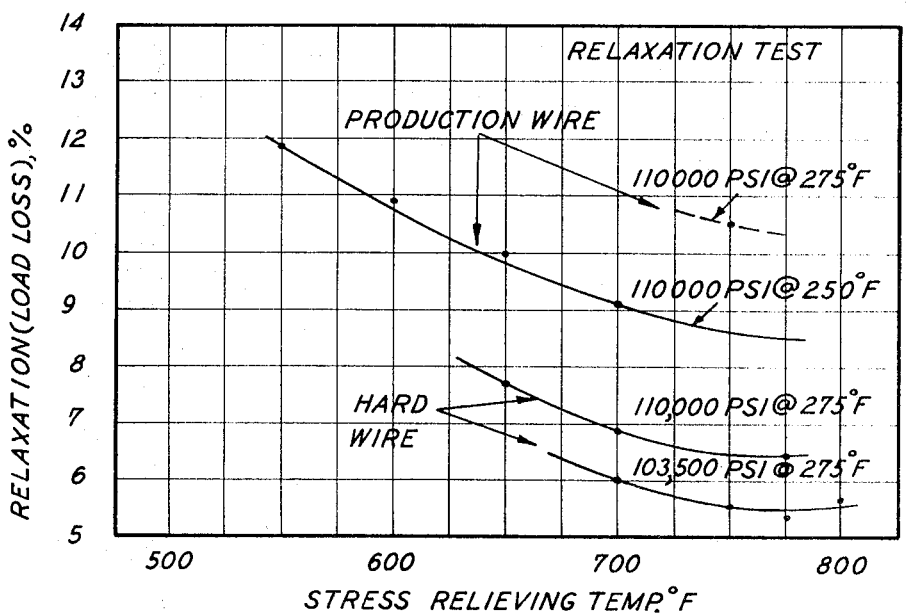

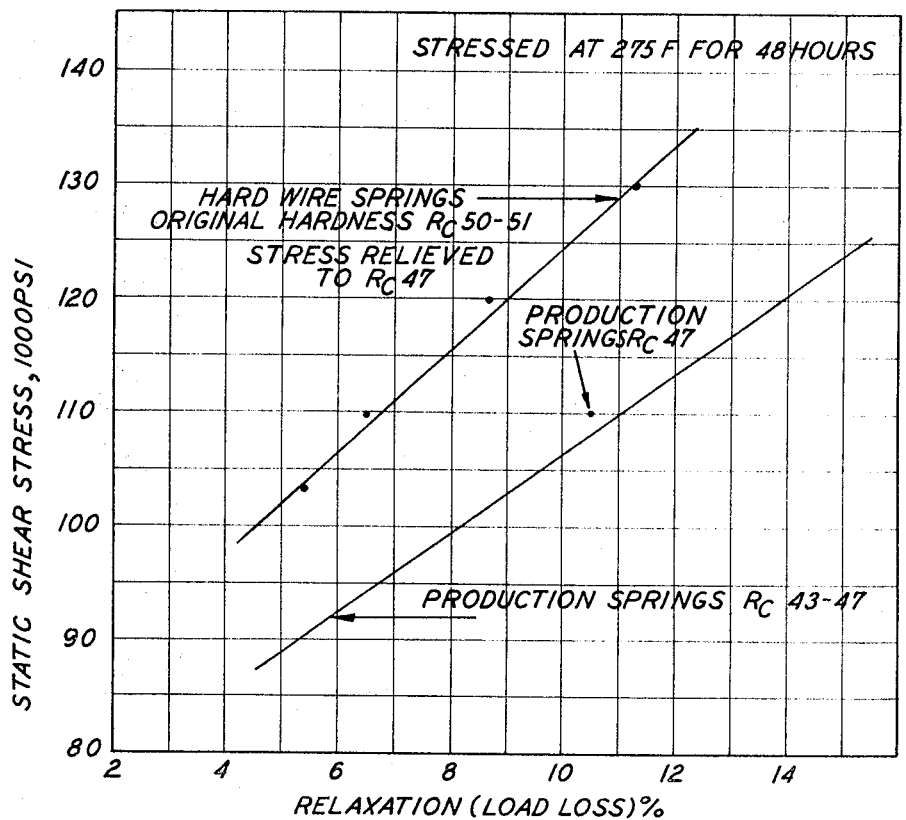

ABSTRACT OF THE DISCLOSURE

Coiled steel internal combustion engine valve springs are produced by hardening carbon steel wire, tempering the hardened wire to an Rc hardness of 50 to 51 at about 700° F., coiling the tempered wire into springs, and then stress relieving the coiled springs at a temperature above the tempering temperature and to a hardness not significantly greater than Rc 47. This results in a spring steel of definitely higher resistance to relaxation in service.

BACKGROUND OF THE INVENTION

Figure 1:
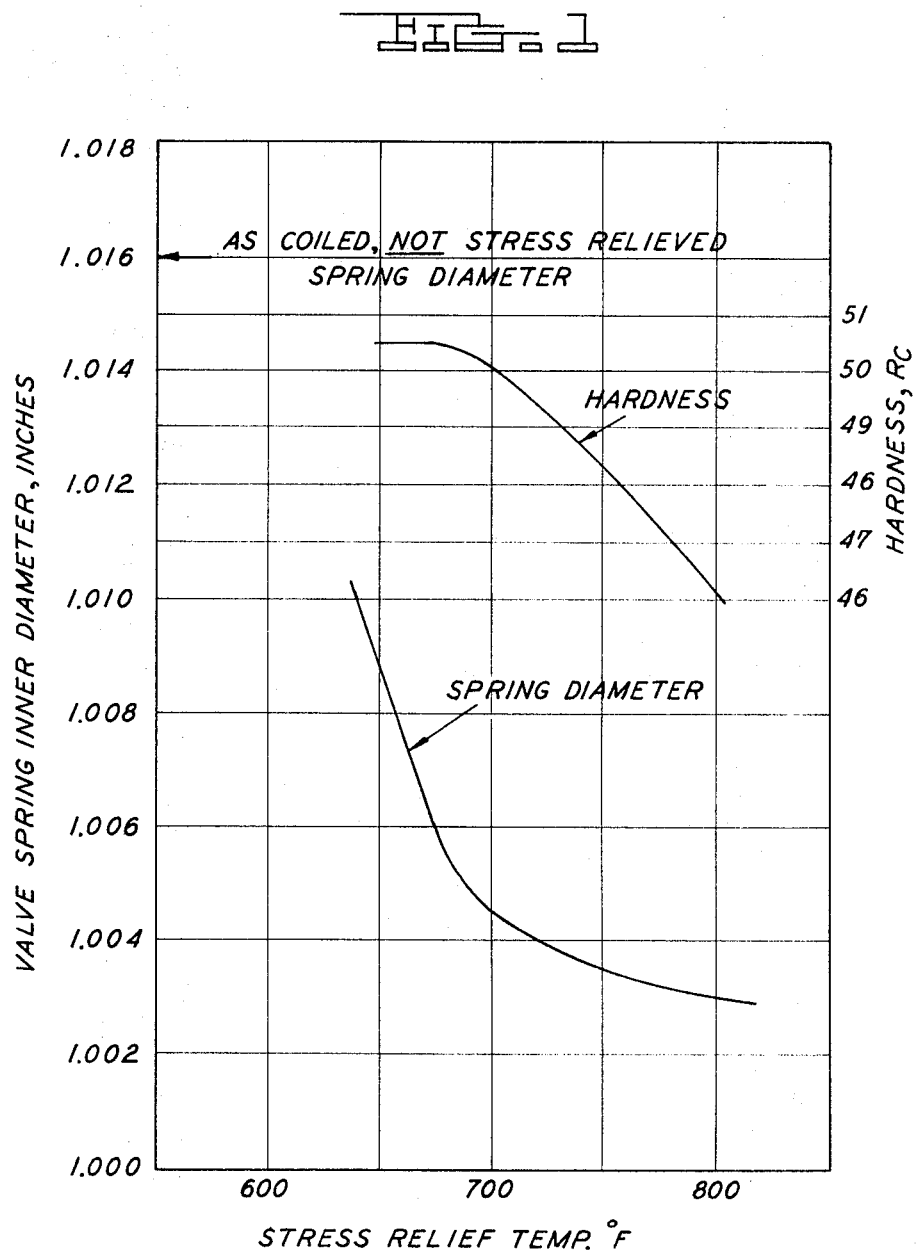

The wire coil springs employed to seat the valves in internal combustion engines undergo very severe conditions in service and are a very critical item in the operation of the engine. These springs are ordinarily produced from carefully processed SAE 1070 steel. These springs have a tendency to relax or deteriorate in load-carrying ability with time and usage at the moderate temperatures to which they are exposed in normal engine operation. This relaxation can lead particularly at high speed to valve "throwing." Either of these conditions can yield to a failure of the valves to seat properly with catastrophic effect upon the operation of the engine.

Currently, internal combustion engine valve coil springs are fabricated from carefully selected SAE 1070 wire which has been hardened, usually by an oil quench. This hardened wire is then tempered at about 800° F. for 30 minutes or to a hardness of Rc 43 to 47. This tempered wire is coiled at ambient temperatures and then stress relieved at 750° F. for thirty minutes. It is to be noted that this stress relieving temperature is lower than the tempering temperature and has essentially no effect upon the hardness of the coiled springs.

Relaxation of these springs is determined by initially compressing the spring to a preselected dimension, measuring the spring load at this preselected dimension, executing the test, and then again compressing the spring to the same preselected dimension and measuring the load. The difference between the first and second load is the spring relaxation and is expressed in terms of the percentage of the original load.

Production test springs are required to survive $10^7$ cycles at ambient temperature at a maximum shear stress of 115,000 pounds per square inch with no more than five percent relaxation.

THE INVENTION

This invention involves the hardening of SAE 1070 steel and then tempering it at a temperature of about 700° F. which will result in a hardness of Rc 50 to 51. The diameter of the wire is 0.186 inch. This wire was formed into coils by winding it around a mandrel 0.981 inch in diameter to give a spring as formed having a diameter of 1.016 inches.

The coiled springs so produced were then given stress relieving thermal treatments at temperatures including temperatures above the original tempering temperature.

FIG. 1 is a graph depicting the stress relieving temperature for one-half hour plotted against the spring hardness and spring diameter. It will be noted that the diameter of the spring decreases from 1.016 to 1.003 inches and the hardness from Rc 51 to Rc 47 as the stress relieving temperature rises to 775° F. This temperature produces a hardness of Rc 47 which is the upper limit not employed.

FIG. 2 again emphasizes the stress relieving temperature and graphs this value against hardness and relaxation. The upper portion of FIG. 2 clearly shows that the stress relieving treatment has no effect upon the hardness of ordinarily produced coiled springs. The decidedly superior qualities of the product of this invention (hard wire) over conventional springs, insofar as relaxation at elevated temperature, is shown by this drawing.

FIG. 3 is a showing of the properties of conventional springs and the hard wire springs of this invention when subjected to static shear tests at various shear levels and at 275° F. for 48 hours.

This very specific process for the production of superior coil valve springs for internal combustion engines enables the use of low cost carbon steel and a decided reduction in the weight of the springs with no sacrifice in performance or durability.

I claim as my invention:
1. The process of producing a relaxation resistant internal combustion engine valve coil spring comprising hardening spring wire formed from steel metallurgically equivalent to SAE 1070 steel, tempering this hardened wire at about 700° F. or to a hardness of Rc 50 to 51, coiling this tempered wire about a mandrel to produce a coil spring larger in diameter than the final spring, and stress relieving the coiled spring at a temperature higher than the tempering temperature to cause the spring to contract in diameter and exhibit a hardness not substantially above Rc 47.
2. The process recited in claim 1 in which the stress relieving temperature is approximately 775° F.

References Cited
FOREIGN PATENTS
846,283    9/1960    Great Britain _____ 29—173

OTHER REFERENCES
Metals Handbook, 1961, vol. 1, 8th ed., pp. 153–174.

CHARLES N. LOVELL, Primary Examiner

U.S. Cl. X.R.
29—173; 140—89; 148—130